Patented Sept. 23, 1930

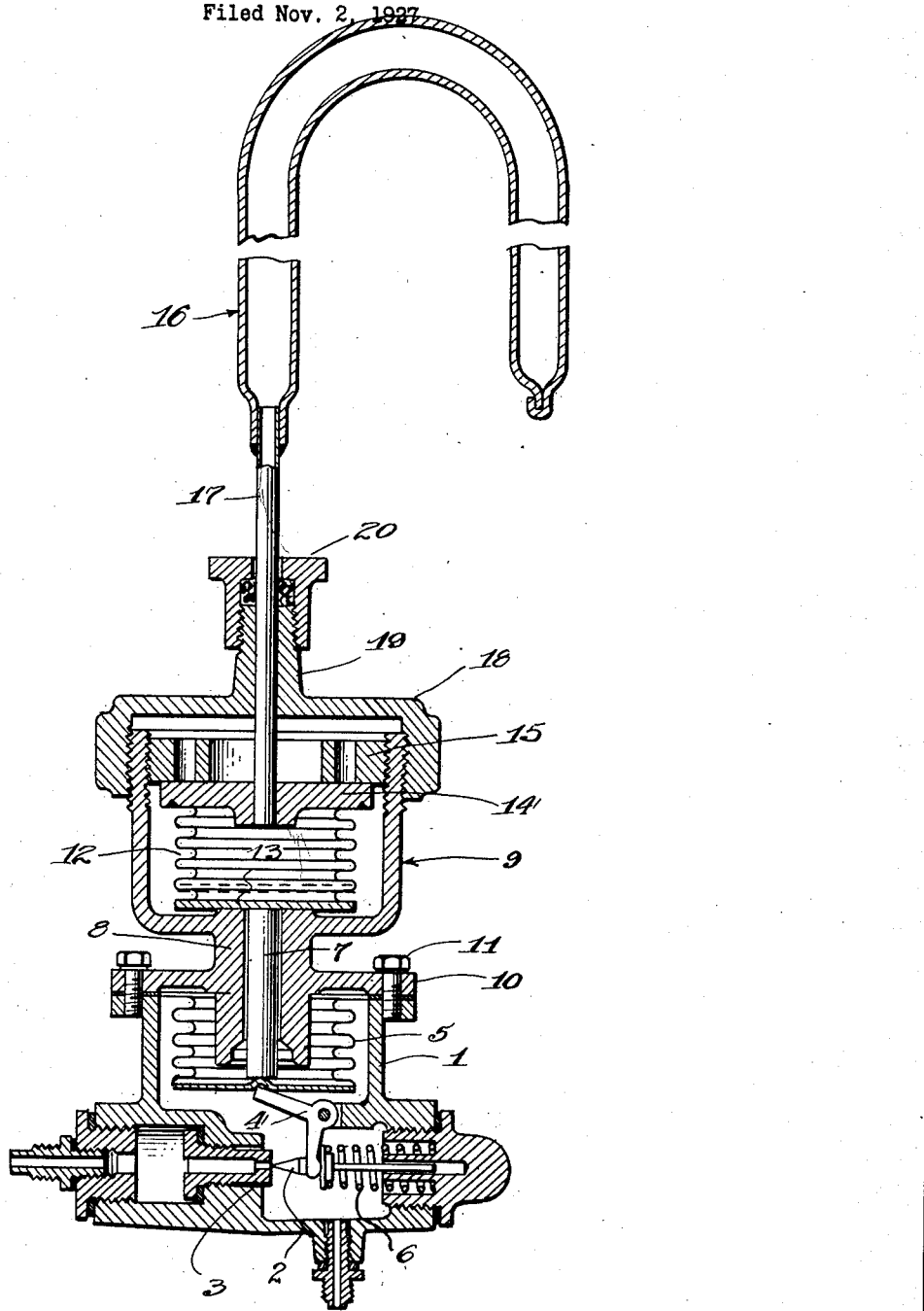

1,776,401

UNITED STATES PATENT OFFICE

HARRY E. THOMPSON, OF DETROIT, MICHIGAN, ASSIGNOR TO UNIVERSAL COOLER CORPORATION, OF DETROIT, MICHIGAN, A CORPORATION OF MICHIGAN

REFRIGERANT CONTROL

Application filed November 2, 1927. Serial No. 230,582.

This invention relates to a refrigerant control, and has to do particularly with a thermostatic control adapted to be used with refrigerating systems of the direct expansion type and designed to control the flow of refrigerant into the cooling unit by directly controlling the expansion valve of such unit.

This invention is particularly adaptable for refrigerating systems having a plurality of cooling units connected to a common refrigerating apparatus; and a thermostatic control of this type is disclosed in my copending application No. 215,091 filed August 24, 1927.

It is the object of the present invention to provide a thermostatic control similar to the control set forth in said copending application, but containing certain novel improvements which are believed to greatly increase the efficiency and positiveness of operation. More specifically, the present invention is directed to the design and arrangement of the bellows or expansible members between the feeler leg and the operating structure of the expansion valve, whereby any operation of one bellows member is accompanied by a similar operation and similar displacement of fluid by the other bellows member with the result that the displacement of fluid is entirely internal. The reason for this limiting of the fluid displacement to the inside of the control structure is to eliminate the drawing in of any atmospheric air into the control structure due to any operation of the bellows or expansible members, and thereby eliminating any chance of freezing or sticking of the movable parts due to condensation and freezing of the atmospheric air thereon.

In the drawings I have illustrated a vertical longitudinal section of my novel structure as removably supported on the casing of the expansion valve.

It will be understood that the expansion valve adapted to be used in connection with my invention may be of any desired type wherein the throttling or opening and closing of the passageway thereto is controlled by movable members. In the drawings I have shown an expansion valve structure of standard design and comprising a housing 1 provided with suitable nipples for connecting the same to a refrigerant conduit and a low side, as will be readily understood by those skilled in the art. A reciprocable valve member 2 is resiliently positioned within the housing 1 and adapted to seat against a suitable valve seat 3, the valve 2 being controlled by a suitable bell crank 4, one leg of the bell crank being operatively held against a bellows member 5 and the other leg being backed by a suitable coil springs 6. It will be obvious that movement of the bellows 5 in one direction or the other will control the throttling or the opening and closing of the valve formed by the members 2 and 3.

The bellows member 5 is adapted to be actuated by a plunger 7 carried by a bearing member 8 formed by an extension of a second housing member 9. This housing 9 is formed of a unitary casting provided with a circular plate member 10 adapted to register with the annular upper end of the housing 1 and also adapted to be connected thereto by means of suitable bolts 11. This securing of the housing 9 to the housing 1 also effects the sealing of the upper portion of the bellows member 5, and any suitable gasket may be inserted between the plate 10 and the housing 1 to assist in sealing the bellows in position. The plunger 7 is supported by the bottom plate of the bellows 5 and is preferably loosely mounted within the bearing member 8. It will thus be obvious that any fluid from within the bellows 5 displaced by its movement will pass to or from the housing member 9 by means of the space between the plunger 7 and the bearing 8.

The housing 9 is so formed as to receive a second bellows member 12 which is provided with an actuating plate 13 adapted to contact with the upper end of the plunger 7. This bellows 12 is preferably of approximately the same diameter as the bellows 5, or at least the diameters of the two bellows are such that an equal amount of fluid will be displaced by the simultaneous movement of the bottom plates of each bellows member. That is, when the plate 13 moves up followed by the plunger 7, the fluid necessary to displace the collapsing of the bellows 12 will be obtained from the collapsing of the bellows 5, the fluid passing from the interior of the bellows 5 into the chamber formed by the housing 9. On the other hand, after the plate 13 is moved downwardly by the gases within the bellows and, correspondingly, the bellows 5 expanded, the movement of the plate 13 will force fluid from the chamber of the housing 9 downwardly into the bellows 5.

The bellows 12 are sealed at their upper end to a suitable plate 14 and this plate may be suitably adjusted by means of the member 15 which is screw threaded within the upper part of the chamber formed by the housing 9. This adjustment is to control any temperature desired in low side, it being obvious that when the fluid within bellows 12 is expanded to a certain point due to rising temperature, that the plate 15, should be in its lowermost position, as shown in the drawing, whereby to open the valve member 2 to permit the flow of refrigerant.

The feeler leg for the control device may be generally designated 16, and may comprise a suitable tube or member adapted to contain a suitable expansible fluid, the tube or other member being so shaped according to the design and location of the low side or refrigerating unit as to quickly record any change in temperature. The inner end of the feeler leg 16 is preferably restricted, as at 17, and passes through the plate 14 so as to be in communication with the interior of the bellows member 12.

The housing 9 is closed by means of a suitable cap 18 preferably adapted to engage suitable threads on the upper end of the housing 9. This cap member 18 is provided with a suitable projection 19 which forms a bearing for and receives the portion 17 of the feeler leg. The portion 17 and the aperture in the extension 19 are preferably in close fitting relation, and in addition to this, a suitable packing member 20 may be positioned on the end of the member 19 so as to positively prevent any entrance of atmospheric air into the interior of the chamber formed by the housing 9. Due to the equality in displacement upon movement of the bellows members 5 and 12, the fluid under ordinary circumstances would normally only pass to and from the interior of the bellows 5 and the exterior of the bellows 12, but I have provided a packing member 20 to insure that no air will be drawn in from the outside. It will thus be seen that upon displacement of the bellows 12 there will be an equal displacement of the corresponding bellows member 5, whereby all the fluid displaced by collapsing of the bellows member 5 will go to the chamber formed by the housing 9 and if the bellows 5 is extended due to expansion of the bellows 12 then all the fluid necessary for expansion of the bellows 5 will be derived from the chamber formed by the housing 9.

It will also be obvious that, if desired, the fluid within the housing 9 and within the bellows member 5 may be a relatively inert fluid or a fluid having different properties than that of the atmosphere. It will furthermore be obvious that the cap member 18 may be readily removed and the bellows member or the feeler leg quickly and easily replaced without in any way disturbing the expansion valve structure in general.

It will thus be seen that I have provided a novel, compact, and easily replaceable structure wherein all the main parts are positively prevented from sticking, due to the drawing in of any atmospheric air or other fluid, subject to condensing and freezing.

The operation of the device is as follows: Assuming that the expansion valve is closed, the bellows 12 and 5 will both be in contracted position. As soon as the temperature in the refrigerator rises to a predetermined degree, the expansive fluid in the feeler leg 16 and the bellows 12 will expand, thereby causing the bellows 12 to expand which in turn causes the fluid to flow from the interior of the housing 9 through the space between the plunger 7 and the bearing 8 and hence, into the bellows 5. The expansion of the bellows 12 by means of the plunger 7 and the influx of the fluid into the bellows 5 causes the bellows 5 to expand and the expansion of the bellows 5 actuates the arm 4 which in turn causes the valve stem 2 to be retracted from the valve seat 3 and thereby allows an influx of the refrigerant. When the temperature in the refrigerator becomes of a sufficiently low degree, the reverse of this operation takes place; that is, the expansive fluid in the feeler leg 16 and the bellows 12 contracts and in turn causes the bellows 12 to contract and the influx of the fluid from bellows 5 into the interior of the housing 9. The withdrawal of the fluid from the bellows 5 causes the bellows 5 to contract and allows the spring 6 of the expansion valve to expand and thereby seat the valve stem 2 upon the valve seat 3 which cuts off the flow of the refrigerant.

What I claim is:

1. A refrigerant control device for refrigerating systems of the direct expansion type, comprising an expansion valve of the type having a movable throttling member, a plunger for actuating the same, an expansible member separating the plunger and throttling member, and a thermostatic unit having an expansible member positioned within a housing and adapted to contact with one end of said plunger, said housing being closed whereby any displacement of fluid takes place solely between said housing and said first named bellows member.

2. A refrigerant control device for expansion valves for refrigerating systems, comprising a pair of bellows members operatively connected and a housing around one of said bellows members and in communication with the interior of said other bellows member, means operatively connecting the said bellows members to an expansion valve for controlling the flow of refrigerant through said valve, and thermostatic means associated with said bellows members to control the expansion and contraction of said bellows.

3. A refrigerant control device for refrigerating systems comprising a valve housing and a valve member therein for controlling the flow of refrigerant therethrough, a second housing mounted on said first named housing, bellows members positioned in each housing, the bellows member in said second housing forming a part of a thermostatic unit influenced by temperature change, and a plunger operatively connecting said two bellows members, said plunger being loosely mounted in its bearing whereby to form a passageway between the interior of said first bellows member and the second named housing.

4. A refrigerant control device for refrigerating systems comprising a valve housing and a valve member therein for controlling the flow of refrigerant therethrough, a second housing mounted on said first named housing, bellows members positioned in each housing, the bellows member in said second housing forming a part of a thermostatic unit influenced by temperature change, and a plunger operatively connecting said two bellows members, said plunger being loosely mounted in its bearing whereby to form a passageway between the interior of said first bellows member and the second named housing, the diameters of said two bellows members being approximately the same.

5. A refrigerant control device for refrigerating systems comprising a valve housing and a valve member therein for controlling the flow of refrigerant therethrough, a second housing mounted on said first named housing, bellows members positioned in each nousing, the bellows member in said second housing forming a part of a thermostatic unit influenced by temperature change, and a plunger operatively connecting said two bellows members, said plunger being loosely mounted in its bearing whereby to form a passageway between the interior of said first bellows member and the second named housing, the second housing being relatively air tight whereby any displacement of fluid caused by movement of said bellows members will take place through said passageway.

6. In a control for a refrigerating system comprising a housing, an expansion valve for controlling the flow of the refrigerant, a plurality of bellows members operatively connected and arranged to actuate the said expansion valve, and a thermostatic unit for actuating the bellows members, a sub-combination of a support member for one of the said bellows members adjustably mounted within the housing whereby the position of the said bellows member relative to the expansion valve may be varied to vary the temperature at which the bellows members will actuate the expansion valve.

In testimony whereof I affix my signature.

HARRY E. THOMPSON.